Patented Nov. 14, 1939

2,180,262

UNITED STATES PATENT OFFICE 2,180,262

PROCESS FOR PREPARING METAL SULPH-HYDRYL COMPOUNDS FROM KERATIN DEGRADATION PRODUCTS

Ernst Sturm, Berlin-Lankwitz, and Richard Fleischmann, Berlin, Germany, assignors to firma Johann A. Wulfing, Berlin, Germany No Drawing. Application June 23, 1937, Serial No. 149,956. In Germany July 24, 1936

13 Claims. (Cl. 260—113)

According to German specification No. 582,000 keratin degradation products are reduced with, amongst other things, sodium sulphite in weakly alkaline medium. In this way, however, it is only possible to convert at most one part of the available SS-groups into SH-groups. By the method of United States specification No. 1,879,505 also keratin degradation products are obtained which are only poor in sulphhydryl groups, for on addition of gold salt up to the point of complete saturation of the sulphhydryl groups products are obtained having a maximum gold content of only 4%. In the specification of United States Patent No. 2,046,795 it is shown that by reduction with zinc and enrichment of the sulphhydryls by isolation of the zinc compounds keratin degradation products which are even richer in sulphhydryl groups are obtainable. Here, however, as also in the case of United States specification No. 1,879,505, the use of hydrogen sulphide for removing the reducing agent is necessary, and an evaporation of the SH-keratin degradation products in vacuum in order to expel the hydrogen sulphide.

It has now been found that the available SS-groups of keratin degradation products can be almost completely converted into SH-groups in a simple manner if the SS-keratin degradation products are treated with sodium hydrosulphite. The solution of reduced keratin degradation products obtained thereby can be brought into direct interaction with metal salts. The employment of hydrogen sulphide and a vacuum apparatus, as in United States specification No. 2,046,795, is therefore not necessary for isolating the keratin degradation products. The present process possesses the further substantial advantage over the process described in the said prior specification that, referred to the starting keratin, at least two or three times the yield is obtained. The treatment of keratin degradation products with sodium hydrosulphite at approximately neutral reaction is naturally much less harmful than the reduction with metals in strongly acid reaction; the new gold or arsenic compounds reveal a better chemo-therapeutic activity than the gold and arsenic compounds obtained with the sulphhydryl keratinic acids according to United States specification No. 2,046,795.

Since by reduction with sodium amalgam only a small fraction, and with sodium sulphite a maximum of one half, of the sulphhydryl groups obtainable by reduction with sodium hydrosulphite is attained, then from the keratin degradation products prepared according to German Patent specification No. 582,000 it is not possible to obtain sulphhydryl compounds as rich in heavy metal as according to the new process, for example gold-sulphhydryl compounds having a gold content of 14 to 31%.

The action of the sodium hydrosulphite takes place in neutral, weakly acid, or weakly alkaline reaction. Weakly acid reacting solutions of the keratin degradation products, are for example, first made alkaline with caustic soda, sodium carbonate, sodium bicarbonate, calcium or strontium hydroxide or organic bases, such as for example diethylamine, and are then treated with sodium hydrosulphite. After the action of the sodium hydrosulphite the reduced solutions react weakly acid, neutral or weakly alkaline, according to the quantity of base which was employed. The reduction is completed even at ordinary temperature, the mixtures undergoing reduction are to be protected from access of air. It is also possible to reduce in the hot, when the reduction takes place very much more rapidly, but the danger of oxidation is greater.

In place of sodium hydrosulphite, its derivatives may also be used, such as for example the sodium salt of formaldehyde sulphoxylic acid.

As starting materials keratin degradation products are used which are rich in sulphur, such as are obtained for example in the known manner by hydrolysis of keratins with acids up to more or less complete solution, followed by dialysis, in which if desired or necessary the acids may be neutralized, and evaporation to dryness, or after removal of the excess acids are obtainable by introduction of the, may be neutralized, solution into organic solvents.

To the solutions of the keratin degradation products which have been neutralized or made weakly alkaline so much sodium hydrosulphite is added, and is caused to react with exclusion of air for so long, until a maximum reduction has taken place, which can be established by titration with silver nitrate up to the point of disappearance of the sodium nitroprusside reaction. In this way the bisulphite or sulphite formed during the reduction exerts a very good protection for the very sensitive sulphhydryl groups against oxidation.

To the solutions reduced in this way heavy metal salts or metal compounds are then added. When using such heavy metal salts which occur in various oxidation stages, such as for example in the case of gold, it is of advantage to use an excess of sodium hydrosulphite so that the higher oxidation stage is reduced by the excess sodium hydrosulphite to the lower oxidation stage.

The addition of the heavy metal salts is effected in the known manner up to the point of disappearance of the sodium nitroprusside reaction. If compounds of those metals are to be prepared in the case of which the sodium nitroprusside reaction cannot be brought to complete disappearance, then the sulphhydryl content of the reduced solutions is determined beforehand in the known manner by titration with silver nitrate up to the point of disappearance of the sodium nitroprusside reaction in a spot test and then the quantity of metal compounds equivalent to the silver nitrate used is added. In this way not only can water-soluble heavy metal salts be caused to react as according to United States specification No. 2,046,795, but in addition the water-insoluble oxides or hydroxides of heavy metals. For example, if silver oxide is stirred into a reduced solution until the sodium nitroprusside reaction has disappeared, then the silver oxide goes up into solution almost instantly, even at ordinary temperature. By using the oxides an admixture of anions, e. g., $NO_3'$ in the case of silver ($AgNO_3$) or $SO_4''$ in the case of copper ($CuSO_4$), can be avoided.

Further, at first only a part of the sulphhydryls of the keratin degradation products can be saturated by means of a metal and then the remainder of the sulphydryl groups bound by means of another metal. In the case of such metal sulphhydryl keratin degradation products, which therefore contain different metals in one molecule, a particularly good therapeutic efficacy is brought about by combination of different metal actions.

On adding the heavy metal salts to the reduced solutions precipitations take place which however usually go up into solution again on stirring. Precipitates which no longer go up into solution in this way, such as for example in the case of the addition of gold salts, are readily dissolved by addition of alkali, alkaline earth or organic bases up to the point of neutral or weakly alkaline reaction. The compounds of bismuth, antimony and arsenic go rapidly into solution in the reduction mixtures; after a short time a small quantity of a precipitate separates out, which is separated off by filtration. From the solutions the metal sulphhydryl compounds are then isolated in the known manner by stirring into organic solvents, such as for example alcohol. However, for the purpose of obtaining gold compounds which are particularly rich in metal, the precipitates can also be separated off from the supernatant liquid and converted into water-soluble compounds by dissolving with bases and precipitating with alcohol. If the oxides or hydroxides of heavy metals are used for the interaction, then the heavy metal sulphhydryl compounds can be obtained by direct evaporation of the reaction solutions in vacuo up to dryness. The only small content of inorganic salts in this case does not prevent therapeutic use of the substances.

All heavy metals which can be used pharmaceutically may be employed for the interaction, as well as the compounds of antimony and arsenic, more particularly aromatic arsonic acids and arsine oxides.

*Example 1.*—Ten grams of keratin degradation product, which has been obtained by hydrolysis of hair with 25% hydrochloric acid on a water bath until only a small residue remains undissolved, followed by dialysis and evaporation to dryness, are dissolved in 44 cc. of water, the solution treated with caustic soda up to the point of weakly alkaline reaction, and then 1.6 grams of sodium hydrosulphite are added. The solution is left standing for sometime with exclusion of air, whereupon a 10% silver nitrate solution is stirred into the reduced solution until a spot test with a drop of ammonia and a drop of sodium nitroprusside with addition of some common salt just no longer yields a red-violet coloration. About 22–26 cc. of the 10% silver nitrate solution are necessary for this purpose. The solution is neutralized with a few drops of caustic soda, filtered and stirred into the multifold quantity of alcohol, whereby a yellow product precipitates out which is washed with alcohol and dried in vacuum. It is readily soluble in water with neutral reaction.

*Example 2.*—To the reduced solution of keratin degradation product prepared according to Example 1 there is added in place of silver nitrate silver oxide which has been obtained by precipitating from 22 to 26 cc. of a 10% silver nitrate solution with caustic soda and repeatedly decanting with water. On stirring the silver oxide goes up into solution at once even at ordinary temperature; after all the silver oxide has been added the sodium nitroprusside reaction is just negative. The solution, which reacts neutral, is filtered and directly evaporated to dryness in vacuum at low temperature. The yellowish product is readily soluble in water with neutral reaction.

*Example 3.*—To the reduced solution of keratin degradation product obtained according to Example 1 cupric oxide is added which has been obtained by precipitating with caustic soda in the hot solution containing 1.6 to 1.9 grams of copper sulphate and repeatedly decanting the precipitate with water. On stirring the cupric oxide goes gradually up into solution and after standing for a short while the solution is coloured again practically the same as before the addition of the cupric oxide. The solution is filtered and stirred into the multifold quantity of alcohol, whereby a pale product separates out which is filtered off under suction, washed with alcohol and dried with vacuum. It is readily soluble in water with neutral reaction.

*Example 4.*—Five grams of a keratin degradation product which has been obtained by hydrolysis of hair on a water bath with 25% hydrochloric acid just up to the point of dissolution, dialysis and evaporation to dryness, are dissolved in 22 cc. of water. The solution is neutralized with caustic soda and 0.8 gram of sodium hydrosulphite is added. After standing in the absence of air 20% gold chloride solution and caustic soda are added alternately to the reduced solution so that there is always a neutral to weakly alkaline reaction. The light precipitate appearing at first goes up into solution again on stirring. So much of the 20% gold chloride solution is added until a spot test with a drop of ammonia and a drop of sodium nitroprusside yields only a slight reaction. For this purpose about 8–9 cc. of 20% $AuCl_3$ solution are consumed. The neutral to weakly alkaline reacting solution is filtered and is worked up as in the preceding example. The yellowish product obtained is readily soluble in water with neutral reaction.

Instead of sodium hydrosulphite it is also possible to use for the reaction 1.2 gram of the sodium salt of formaldehyde sulphoxylic acid.

The solution of the keratin degradation products can also be made alkaline, or the reaction mixture which has become acid owing to the addition of gold chloride can also be neutralized, with calcium hydroxide or diethylamine instead of with caustic soda. When using calcium hydroxide somewhat less gold chloride is used up.

*Example 5.*—Five grams of keratin degradation product, which has been obtained by hydrolysis of wool with 25% hydrochloric acid on a water bath up to not quite complete dissolution, followed by dialysis and evaporation to dryness, are dissolved in 23 cc. of water, the solution mixed with caustic soda until the reaction is weakly alkaline and thereupon 0.8 gram of sodium hydrosulphite is added. Since the keratin degration product contains less free SS-groups than the products used in the preceding examples, the sodium hydrosulphite is in excess. After standing in the absence of air, there is stirred into the solution alternately 10% potassium auribromide solution and caustic soda, so that there is always an approximately neutral reaction. After addition of about 18 cc. of the 10% potassium auribromide solution there is still only a weak sodium nitroprusside reaction. The solution is worked up as in the foregoing examples. The product obtained is very readily soluble in water with neutral reaction.

*Example 6.*—Five grams of keratin degradation product, which has been obtained by hydrolysis of hair with 25% hydrochloric acid on a water bath up to not quite complete dissolution, neutralization with caustic soda, dialysis and evaporation to dryness, are dissolved in 25 cc. of water, the solution made slightly alkaline with caustic soda and then treated with 1.0 gram of sodium hydrosulphite, that is to say in excess. After standing in the absence of air a 20% gold chloride solution is added in portions whilst thoroughly stirring until there is still only a very slight sodium nitroprusside reaction. About 9–10 cc. of the 20% $AuCl_3$ solution are necessary for this purpose. The light precipitate appearing on addition of the gold chloride solution is separated off after settling or centrifuging off of the supernatant, still only slightly colored, liquid, after which it may be washed with water, dissolved in a little water with addition of caustic soda up to the point of neutral or weakly alkaline reaction, and then precipitated with alcohol, filtered at the pump, washed with alcohol, and dried in vacuum. The pale yellowish product is readily soluble in water with neutral reaction.

*Example 7.*—Five grams of keratin degradation product, which has been obtained by hydrolysis on the water bath with 20% hydrochloric acid until only a very small residue remains undissolved, followed by dialysis and evaporation to dryness, are dissolved in 25 cc., of water, the solution treated with caustic soda up to the point of weakly alkaline reaction, and then 0.8 gram of sodium hydrosulphite is added. After standing in the absence of air 4–4.5 cc. of a 20% $AuCl_3$ solution and caustic soda are alternately stirred into the solution so that there is always a neutral to weakly alkaline solution. There are now added while stirring 2.6 to 3 cc. of 20% mercury acetate solution. There is then just a weak sodium nitroprusside reaction. The neutral reacting solution is worked up as in the foregoing examples. The yellowish product obtained is readily soluble in water with neutral reaction. Instead of mercury acetate, 0.35 gram of bismuth sodium tartrate may also be added. The yellowish gold bismuth compound is likewise readily soluble in water with neutral reaction.

*Example 8.*—Five grams of a keratin degradation product which has been obtained by hydrolysis of hair on a water bath with 25% hydrochloric acid just up to dissolution, followed by dialysis and evaporation to dryness, are dissolved in 22 cc. of water, the solution made weakly alkaline with caustic soda, and then 0.8 gram of sodium hydrosulphite added. To the reduced solution, after standing in the absence of air, 1.1 to 1.3 grams of sodium antimonyl tartrate are added, which forthwith go into solution, and the whole is left to stand further. After some time a slight precipitate settles out, which is separated off by filtration. The filtrate is worked up as in the foregoing examples. The yellowish product is readily soluble in water.

Instead of sodium antimonyl tartrate one can also add: 0.4–0.5 g. phenylglycinamide-p-arsonic acid, or 0.4–0.5 g. of 4-hydroxy-3-acetylaminophenyl arsonic acid or 2-hydroxy-4-acetylaminophenyl arsonic acid, or 0.4 g. of 4-hydroxy-3-aminophenyl arsonic acid. For the neutralization sodium bicarbonate can also be used in place of caustic soda. The interaction with the arsonic acids may also be carried out whilst gently heating. The arsonic compounds obtained are readily soluble in water with neutral reaction.

What we claim is:

1. A process for preparing metal sulphhydryl compounds from keratin degradation products consisting in reducing said keratin degradation products in aqueous solution with a substance selected from the group consisting of: sodium hydrosulphite, formaldehyde compounds of sodium hydrosulphite, alkaline earth metal hydrosulphite and formaldehyde derivatives of alkaline earth metal hydrosulphite, under conditions in the neighborhood of neutrality, allowing the mixture to stand in the absence of air, directly adding to the solution a water-soluble salt of a metal selected from the following group of metals: copper, arsenic, antimony, gold and silver in quantity sufficient to saturate the sulphhydryl groups, and separating the metal sulphhydryl compounds formed.

2. A process for preparing metal sulphhydryl compounds from keratin degradation products consisting in reducing said keratin degradation products in aqueous solution with the sodium salt of formaldehyde sulphoxylic acid under conditions in the neighborhood of neutrality, allowing the mixture to stand in the absence of air, directly adding to the solution a water-soluble salt of a metal selected from the following group of metals: copper, arsenic, antimony, gold and silver in quantity sufficient to saturate the sulphhydryl groups, and separating the metal sulphhydryl compounds formed.

3. A process as claimed in claim 1 in which the keratin degradation product is obtained by hydrolysing keratins with diluted acids up to approximately complete solution, dialysing the resulting solution, and evaporating to dryness.

4. A process as claimed in claim 1 in which the keratin degradation product is obtained by hydrolysing keratins with diluted acids up to approximately complete solution, removing excess acid and precipitating with an organic liquid.

5. A process as claimed in claim 1 in which the reduction is carried out under weakly alkaline conditions.

6. A process as claimed in claim 1 in which the metal sulphhydryl compounds formed are separated by precipitating them with organic liquid and then filtering them off.

7. A process as claimed in claim 1 in which the metal sulphhydryl compounds formed are separated by vacuum evaporation.

8. A process as claimed in claim 1 in which the reaction mixture is neutralized before separation of the metal sulphhydryl compounds formed.

9. A process for preparing gold sulphhydryl compound from keratin degradation products consisting in reducing said keratin degradation products in aqueous solution with a substance selected from the group consisting of: sodium hydrosulphite, formaldehyde compounds of sodium hydrosulphite, alkaline earth metal hydrosulphite and formaldehyde derivatives of alkaline earth metal hydrosulphite, under conditions in the neighborhood of neutrality, allowing the mixture to stand in the absence of air, directly adding to the solution sufficient soluble gold salt to saturate the sulphhydryl groups, separating off the precipitate, dissolving the precipitate by adding of bases, reprecipitating with an organic precipitating agent, and separating the precipitate of gold sulphhydryl compound.

10. A process for preparing metal sulphhydryl compounds from keratin degradation products consisting in reducing said keratin degradation products in aqueous solution with a substance selected from the group consisting of: sodium hydrosulphite, formaldehyde compounds of sodium hydrosulphite, alkaline earth metal hydrosulphite and formaldehyde derivatives of alkaline earth metal hydrosulphite, under conditions in the neighborhood of neutrality, allowing the mixture to stand in the absence of air, directly adding to the solution in succession at least two substances selected from the group consisting of: heavy metal salts, water-soluble salts of copper, arsenic, antimony, gold and silver, the total addition being sufficient to saturate the sulphhydryl groups, and separating the metal sulphhydryl compounds formed.

11. A process for preparing gold sulphhydryl compounds from keratin degradation products consisting in reducing by means of sodium hydrosulphite a weakly alkaline solution of the keratin degradation product obtained by hydrolysing wool on a water bath with 25% hydrochloric acid until only a small residue remains undissolved, followed by dialysis and evaporation to dryness, allowing the mixture containing the hydrosulphite to stand for a time in the absence of air, adding alternately to the solution dilute potassium auribromide solution and caustic soda, so that there is always an approximately neutral reaction, until the sodium nitroprusside is only weak, filtering, stirring into an excess of alcohol, and separating the precipitated gold sulphhydryl compound.

12. A process for preparing a mercury gold sulphhydryl compound from keratin degradation products, consisting in reducing by means of sodium hydrosulphite a weakly alkaline solution of the keratin degradation product obtained by hydrolysing hair on a water bath with 25% hydrochloric acid until only a small residue remains undissolved, followed by dialysis and evaporation to dryness, allowing the mixture containing the hydrosulphite to stand for a time in the absence of air, adding dilute auric chloride solution and caustic soda alternately to the solution so that the reaction is always neutral to weakly alkaline, the quantity of gold added being insufficient to saturate the sulphhydryl groups, then adding dilute mercury acetate solution until the sodium nitroprusside reaction is just weak, filtering, stirring the solution in an excess of alcohol, and precipitating the mercury gold sulphhydryl compound.

13. A process as claimed in claim 1 for making an arsenic sulphhydryl keratin compound in which the arsenic compound added to the reduced solution is a substituted phenylarsonic acid.

ERNST STURM.
RICHARD FLEISCHMANN.